Nov. 8, 1966   O. K. NILSSEN   3,284,800
CONTINUOUS WAVE RADAR SYSTEM
Filed April 15, 1965   2 Sheets-Sheet 1
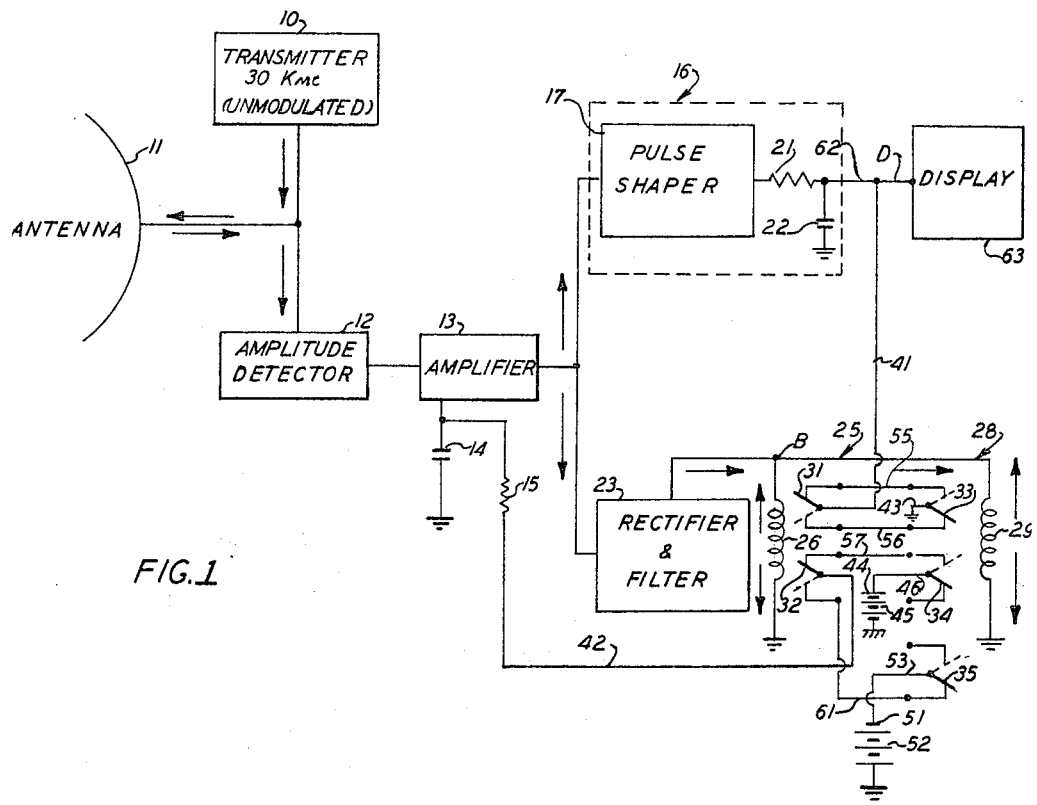
FIG.1
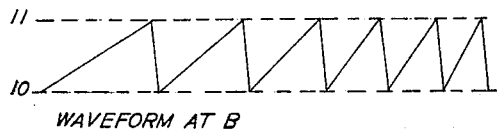
WAVEFORM AT B   FIG.2
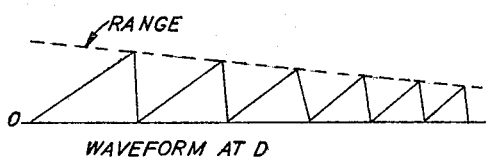
WAVEFORM AT D   FIG.3
OLE K. NILSSEN
INVENTOR
BY John R. Faulkner
Keith L. Gerschling
ATTORNEYS Nov. 8, 1966  O. K. NILSSEN  3,284,800

CONTINUOUS WAVE RADAR SYSTEM

Filed April 15, 1965  2 Sheets-Sheet 2

OLE K. NILSSEN
INVENTOR.

BY
ATTORNEYS

3,284,800
CONTINUOUS WAVE RADAR SYSTEM
Ole K. Nilssen, Livonia, Mich., assignor to Ford Motor Company, Dearborn, Mich., a corporation of Delaware
Filed Apr. 15, 1965, Ser. No. 448,415
8 Claims. (Cl. 343—12)

This invention relates to a continuous wave radar system and more particularly to a continuous wave radar system capable of measuring a wide gamut of ranges, requiring an absolute minimum of bandwidth and radiated power, and using uncomplicated and inexpensive information processing equipment.

The present invention is a modification of the invention disclosed in my copending application S.N. 415,138, filed December 1, 1964. That application was based upon the principle that the strength of a signal reflected from a target varies in accordance with an inverse power of range that may be stated mathematically by the following equation:

$$S = C \cdot R^{-n}$$

where S is the strength or magnitude of the reflected signal and R is range. C is a constant depending upon the strength of the transmitted signal, the directivity and efficiency of the transmitting and receiving antenna, the wave length of the radiated signal, and the radar cross section of the target. $n$ is a constant, the exact value of which depends upon certain conditions such as atmospheric absorption which in turn depends upon the carrier frequency of the radar system. If S is given in terms of power, $n$ will ordinarily be 4, but if given in terms of voltage, will ordinarily be equal to 2. Thus, for a given target the only variables are S and R.

In the above mentioned application, it was shown that range may be given by the following equation:

$$R = n \cdot (dR/dS)/S$$

This equation was derived from the original equation given above, by the following development:

$$S = C \cdot R^{-n}$$
$$dS = -n \cdot C \cdot R^{-(n+1)} dR$$

Dividing the second equation by the first gives:

$$dS/S = n \cdot dR/R$$

and rearranging this equation gives $$R = n \cdot (dR/dS)/S$$

It can be readily appreciated that the above equation can be written as $$R = n \cdot (\Delta R/\Delta S)/S$$

By making $\Delta S$ a sufficiently small fraction of S, the approximate expression for R can become quite accurate.

In the present invention, means are provided for recognizing a certain relative change in signal strength, that is, $\Delta S/S$. When this becomes known, it can be appreciated that range may be obtained by measuring $\Delta R$ during the period that this relative change in signal strength takes place. This may be done by counting the number of Doppler beats during the period that the signal strength changes by a certain amount. For example, it becomes evident from the above equation that range may be determined by counting Doppler cycles during a period of a certain increase or decrease, for example, a 10% increase or decrease, in the received signal voltage.

In the invention, a hysteresis device, for example, a bistable switching device having a given hysteresis is employed to recognize a certain relative change in signal strength, that is, $\Delta S/S$. This hysteresis device simultaneously sets the interval for counting the number of Doppler beats or cycles received during this period of relative change. By properly taking into account the value of $n$ in the above equation, it can readily be appreciated that range may be read directly out from a counter arrangement since $\Delta R$ in this case is directly proportional to range. This is true because both $n$ and $\Delta S/S$ are constant for the given counting period.

An object of the present invention is the provision of a novel and uncomplicated radar system in which information processing can be accomplished by inexpensive, uncomplicated and conventional electrical devices.

Another object of the invention is the provision of a novel and uncomplicated continuous wave radar system in which range may be determined directly by counting the number of Doppler cycles that occur during a given relative change in the strength of the reflected signal.

Other objects and attendant advantages of the present invention may be more readily realized when the specification is considered in connection with the attached drawings, in which:

FIGURE 1 is a block and circuit diagram of the radar system of the present invention;

FIGURE 2 is a waveform present at the output of the rectifier and filter or at the letter B in FIGURE 1 for a target in which the range is decreasing;

FIGURE 3 is a waveform present at the letter D, or at the output of the counter circuit in FIGURE 1 for a target in which the range is decreasing.

Figure 4:
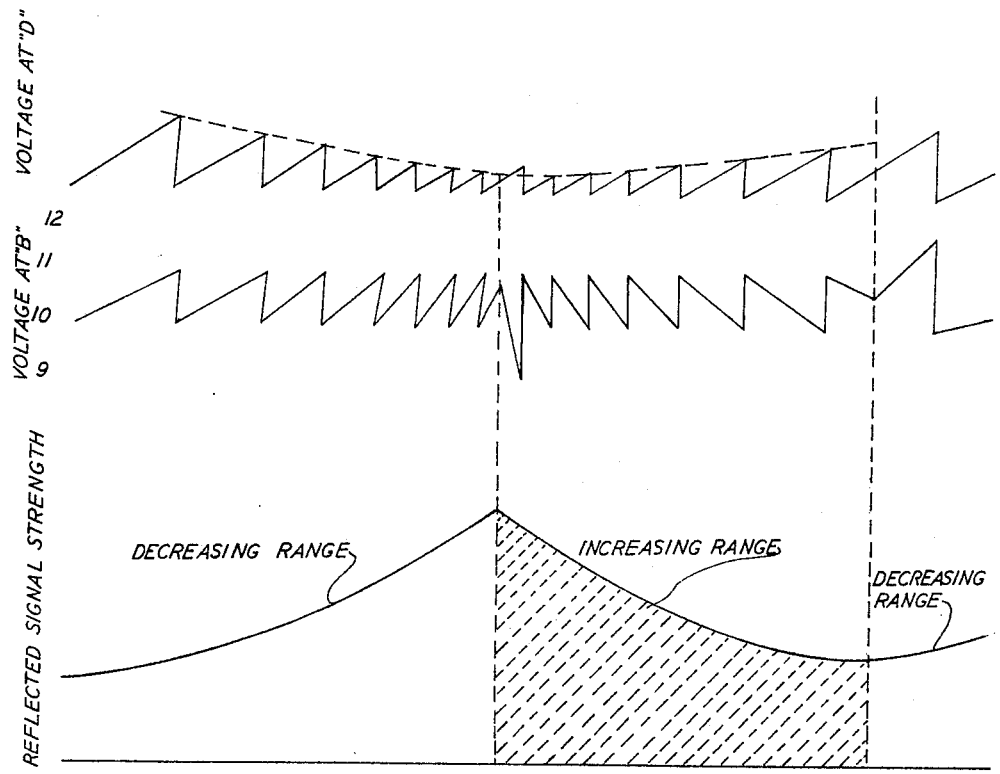
FIGURE 4 shows the reflected signal strength, voltage at D, the output of the counter, and the voltage at B, the output of the rectifier and filter of FIGURE 1, for a target in which range is first decreasing, then increasing and then decreasing.

Referring now to the drawings in which like reference numerals designate like parts throughout the several views thereof, there is shown in FIGURE 1 a continuous wave transmitter 10 preferably producing a continuous wave signal which is unmodulated. This continuous wave transmitter includes or is coupled to an antenna 11 for transmitting or radiating a continuous wave signal toward a target. The reflected or echo signal from the target is received by the antenna 11 and is transmitted to a detector means in the form of an amplitude detector 12. This amplitude detector 12 also receives, as shown on the block diagram, a highly attenuated portion of the signal produced by the continuous wave transmitter 10. The echo or reflected signal from the antenna 11 and the highly attenuated signal from the continuous wave transmitter 10 are combined in the detector means or amplitude detector 12.

It can be readily appreciated by those skilled in the art, that the output from the detector means or amplitude detector 12 is the Doppler signal which has a frequency that is a direct measure of range rate. The amplitude or strength of this signal is a direct measure of the strength of the reflected signal, or a direct measure of the quantity S given in the above equation.

The output from the detector means or amplitude detector 12 (the Doppler signal) is applied to an amplifier 13 for amplifying this signal. The amplifier 13 contains some means for adjusting or changing the overall gain of the amplifier in response to an external signal. This means may take the form of a gain control device contained within the amplifier that is responsive to a voltage on the capacitor 14 which may be charged through a charging resistor 15 from a source of electrical energy that will be described subsequently.

The output from the amplifier 13 is fed to a counter 16 that may take the form of a pulse shaper 17 and an integrating network in the form of a resistor 21 and a capacitor 22. The output from the pulse shaper 17 will be a series of identical unidirectional pulses, one for every Doppler cycle. These pulses are integrated in the resistor-capacitor combination 21 and 22 so that the voltage across the capacitor 22 will be a direct function of the number of Doppler cycles applied to the counter 16 during any given period.

The output from the amplifier 13 is also fed to a rectifier and filter 23 which rectifies and filters the output from the amplifier 13. It can be appreciated that the unidirectional output voltage from this rectifier and filter 23 is a measure of the strength of the reflected signal from the target since it is proportional to the strength of the Doppler signal present at the output of the amplitude detector 12.

The output from the rectifier and filter 23 is fed to the input of a hysteresis device, for example, an electrical switch having a selected or predetermined amount of hysteresis. This device may take the form of a first relay 25 having an input winding 26 and a second relay 28 having an input winding 29.

The first relay 25 has a pair of arms or armatures 31 and 32 that are operated in unison, while the second relay 28 has three arms or armatures 33, 34 and 35 that are operated in unison. The arm 31 of the first relay 25 is coupled through a lead 41 to the integrating network capacitor 22 of counter 16. The arm 32 is coupled through a lead 42 to the charging resistor 15 and capacitor 14 that controls the gain of the amplifier 13. The movable arm 33 of the relay 28 is connected to ground through a lead 43, while the movable arm 34 of the relay 28 is connected to the positive terminal 44 of a source of electrical energy 45 through a lead 46, and the movable arm 35 is connected to the negative terminal 51 of a source of electrical energy 52 through a lead 53. The sources of electrical energy 45 and 52 may be 200 volt electrical storage batteries.

The upper contacts for the movable arms 31 and 33 of relays 25 and 28 respectively are coupled through a lead 55, while the lower contacts for these two arms are coupled through a lead 56. Similarly, the upper contacts for the movable arms 32 and 34 of the relays 25 and 28 respectively are coupled through a lead 57, while the lower contact for the movable arm 32 is coupled to the lower contact for the movable arm 35 of relay 28 through a lead 61.

The output of the counter circuit 16 which is the unidirectional voltage found on the capacitor 22 of the integrating network, is coupled through a lead 62 to a display device 63 that displays the voltage on the capacitor 22. This display device may take the form of a cathode ray tube in which the voltage on the capacitor 22 is fed to the horizontal sweep circuit of the tube.

The operation of the invention will now be described on the basis that the relay 25 is actuated so that the movable arms 31 and 32 move from the position shown, in which the movable arms 31 and 32 are in engagement with their upper contacts, into engagement with the lower contacts when the voltage appearing at point B on the drawings, the output of the rectifier and filter 23 rises to 11 volts. The movable arms 31 and 32 will resume their original position shown when the voltage present at point B drops to 10 volts. The fact that the movable arms 31 and 32 move from the position shown on the drawings where they are in engagement with the upper contacts of relay 21 into engagement with the lower contacts when the voltage at point B, and across the winding 26, rises to 11 volts and resume their original position when the voltage at point B, and across the relay winding 26, falls to 10 volts provides a hysteresis effect in the relay 25 of 1 volt.

It can readily be appreciated that in conventional relays the armatures are spring urged in one direction and in this case the arms 31 and 32 are spring urged into contact with the upper contacts. The force of the spring must be overcome to move the armature or arms 31 and 32 from the upper contacts to the lower contacts. This force is provided by the magnetic field generated in the winding 26, and in conventional relays when the arm does move, it moves closer to the structure of the relay winding thereby providing an increasing force as the arms or armature move from the upper contacts to the lower contacts. Consequently, when the arms 31 and 32 are in engagement with the lower contacts, it requires a lesser force and hence a lesser voltage through the winding to maintain them in this position. As a result, the voltage must fall to a value below that which moves the contacts from the upper contacts to the lower contacts in order for the armature, or arms 31 and 32, to return from the lower contacts to the upper contacts. In the example given here, with the relays 25, a relay may be selected that has a hysteresis value of 1 volt.

On the other hand, the movable arms 33, 34 and 35 of relay 28 will move upwardly from engagement with their lower contacts as shown, into engagement with their upper contacts when the voltage present at the point B, or at the output of the rectifier and filter 23, falls to 9 volts. The arms 33, 34 and 35 will resume the position shown on the drawings in which they are in contact with the lower contacts when the voltage at point B, or the output voltage of the rectifier and filter, rises to 12 volts. It can be readily appreciated that these values are given as examples only for the discussion of the operation of the radar system of the present invention, and that other values, depending upon the relative speed between the system and the target, the ranges to be measured, the nature of the targets and the accuracy desired, may be readily employed.

For purposes of explanation, it will be assumed that the voltage on capacitor 22 is zero and that the output voltage of the rectifier and filter found at point B is exactly equal to 10 volts. It will be seen later in the explanation exactly how this occurs for a given cycle. The output from the amplifier 13 is fed to the rectifier and filter 23, and as pointed out previously, the magnitude of this unidirectional voltage is a measure of the reflected signal strength S. The output from the amplifier 13 is simultaneously fed to the pulse shaper 17, and the integrating network composed of capacitor 22 and resistor 21 that form the counting circuit 16.

If, for example, the target is approaching the radar system, the strength of the reflected signal will be increased, and as a result, the output of the rectifier and filter 23 present at the point B will be increased. When this voltage increases by one volt, that is, 10 volts to 11 volts, the arms 31 and 32 of the relay 25 will be actuated by this voltage appearing at the input winding 26 and they will move out of engagement with their upper contacts and into engagement with their lower contacts.

During the time that the voltage increases at point B from 10 to 11 volts, the counter 16 counts the number of Doppler cycles or beats from the amplifier 13, and this is represented by an increasing voltage on the capacitor 22.

When the movable arms 31 and 32 of relay 25 move into engagement with their lower contacts as the result of the voltage at point B reaching 11 volts, the capacitor 22 is discharged to ground through the lead 41, the movable arm 31, the lead 56 and the movable arm 33 of relay 28. Simultaneously, the negative terminal 51 of source of electrical energy 52 is connected to the charging resistor 15 and capacitor 14 through lead 53, movable arm 35 of relay 28, lead 61, movable arm 32 of relay 25, and lead 42. This reduces the charge on the capacitor 14 and hence lowers the gain of the amplifier 13.

The time constant of the resistor-capacitor combination 14 and 15 should be such as to reduce the gain of the amplifier 13 rapidly with respect to the time it takes for the Doppler voltage output present at the point B to increase the one volt required to actuate the relay 25. This reduction in gain of the amplifier 13 thus reduces the voltage output of the rectifier and filter 23 found at point B. At the point where this voltage reaches 10 volts, the relay 25 opens and the movable arms 31 and 32 move back into their original positions in which the arms are in engagement with their upper contacts thereby decoupling the battery 52 from the charging resistor 15 and the capacitor 14 and decoupling the capacitor 22 from ground. As the target continues to approach the system, this action previously described will again take place, that is, as the voltage at point B rises to 11 volts, the relay 25 will be actuated thereby discharging the capacitor 22 to ground and coupling the negative terminal 51 of the battery 52 to the charging resistor 15 and the capacitor 14, to reduce the gain of the amplifier.

It can be readily appreciated that the unidirectional voltage present on the capacitor 22 is a direct measure of $\Delta R$, and that the peak voltage present on this capacitor 22 at the time of the actuation of relay 25, i.e., when movable arms 31 and 32 move from their upper position to their lower position, is a direct measure of $\Delta R$ for the period or time necessary to have a change in the relative signal strength of 10%. This latter figure may be arrived at when it is considered that the relay 25 is actuated by a 1 volt increase in signal strength from 10 to 11 volts. Thus $S$ may be taken as 10 volts and $\Delta S$ as 1 volt.

Now considering the original equation in which $R$ or range equals $n(\Delta R/\Delta S)/S$, it can be seen that the charge or voltage on the capacitor C is directly proportional to range at the time that the relay 25 is actuated to discharge this capacitor 22. This is true because $n$ is a known quantity depending upon the various operating parameters of the system, and $\Delta S/S$ is a known quantity as determined by the operating parameters of the relay 25. In this case $\Delta S/S$ is equal to 0.1. A display device may be used incorporating these parameters to read out the range directly by displaying the peak voltage present on capacitor 22 just prior to its discharge on any conventional display device. For example, if the voltage on the capacitor 22 is applied to the horizontal sweep circuit of a cathode ray tube, the range may be directly displayed on a scale calibrated for the constants $n$ and $\Delta S/S$. The furthermost excursion of the beam from its original horizontal position will be in this case a direct reading of range.

The waveforms present at B, the output of the rectifier and filter 23, and at D, the voltage on the capacitor 22, are shown in FIGURES 2 and 3 respectively. It should be noted that the waveform at B at the peak-to-peak variation is always between 10 and 11 volts, but that the time base varies, the closer the target the shorter the time base for a given relative speed. The waveform at D, on the other hand, will have a time base that varies directly as the waveform at B, since the time bases of these waveforms are controlled by the switching of the relay 25. The peak voltage found on the capacitor 22, at the point D, will decrease with an approaching target at each actuation of the relay 25. It can be appreciated, however, from an inspection of FIGURE 3, that either the peak or the average output of the counter 16 represented by the voltage on the capacitor 22 may be used as a direct measure of range.

The operation of the radar system of the present invention has been discussed only in relation to an approaching target. The system of the present invention is capable, however, of measuring both an increase in range and a decrease in range, and will automatically handle a reversal in the range rate that occurs during a transition between a decrease and an increase in range. As previously explained with an approaching target, the initial position of the relays 25 and 28 may be that shown in FIGURE 1. When the voltage at point B or the output of the rectifier and filter 23 reaches 11 volts, relay 25 closes. This applies the negative voltage of the battery 52 to reduce the voltage on the capacitor 14, and shorts the capacitor 22 of the counter 16 to ground. When the gain of the amplifier 13 is reduced to the point where the voltage at the point B or the output of the rectifier and filter reaches 10 volts, relay 25 will open. Now, if before the voltage at the point B again reaches 11 volts, the signal strength of the received signal begins decreasing. As a result of a reversal of range rate or a receding rather than an approaching target, the voltage at the point B or at the output of the rectifier and filter will eventually drop to 9 volts, the voltage at which the relay 28 will be actuated. At this point, the movable arms 33, 34 and 35 of relay 28 will move out of engagement with their lower contacts and into engagement with their upper contacts. As a result, capacitor 22 is discharged to ground through lead 41, the movable arm 31 of relay 25 which will be positioned in the position shown, since the voltage at point B is below 11 volts, the lead 55 and the movable arm 33 of relay 28.

The movement of the movable arm 34 of relay 28 into engagement with its upper contact will apply the voltage present at the positive terminal 44 of the source of electrical energy 45 to the charging resistor 15 and the capacitor 14 through the lead 46, the movable arm 34, the lead 56, movable arm 32 of relay 25, and lead 42. This positive voltage will increase the gain of the amplifier 13 until the voltage at the point B reaches 11 volts. At this time, the relay 25 will be actuated thereby moving the movable arms 31 and 32 into contact with their lower contacts. At this time, the relay 28 is in its unactuated position and the arms 33, 34 and 35 are in engagement with the uppermost contacts since the voltage at point B is only 11 volts and not the 12 volts necessary to actuate relay 28. This movement of the movable arms 31 and 32 into engagement with their lower contacts will disconnect the negative terminal 51 of the source of electrical energy 45 from the charging resistor 15 and capacitor 14 thereby freezing the gain of the amplifier.

Since the target is receding and the range is increasing, the voltage output of the rectifier and filter at the point B will gradually decrease and eventually reach 10 volts at which time the movable arms 31 and 32 move back to the position shown in FIGURE 1. This action connects the positive terminal 44 of battery 45 to the charging resistor 15 and capacitor 14 through the movable contact 34 of relay 25 which is in the upper position, lead 57, the movable arm 32 of relay 25 which is in the upper position, and the lead 42. This will increase the gain of the amplifier 13, and the output of the rectifier and filter 23 at point B until the voltage again reaches 11 volts at which time the relay 25 will again be actuated so that the movable arms 31 and 32 move into the lower positions thereby decoupling the positive terminal 44 of the source of electrical energy 45 from the capacitor 14.

The voltages appearing at the points B and D as a result of the change of range rate together with the strength of the reflected signal can be appreciated from an inspection of FIGURE 4. The changes of the voltages at point B as the range rate changes from a decreasing to an increasing range have been discussed above. The voltages appearing at point D during this interval are shown in FIGURE 4, and it is apparent from the waveform shown that a momentary reading inaccuracy may occur in the range since the capacitor 22 is discharged by the action of relays 25 and 28 over two time intervals rather than over one time interval. This inaccuracy is only momentary, however, and causes no appreciable problem.

If the relative speed of the target again reverses such that the target commences to approach rather than recede resulting in a decreasing rather than an increasing range, the relay voltage found at point B or the output of the rectifier and filter 23, will rise to the level of 12 volts. At this time, the relay 28 will be actuated and the movable arms 33, 34 and 35 will move into the positions shown in FIGURE 1. It can be appreciated by an inspection of FIGURE 4 at the right-hand margin, that this occurs at the dotted line between the increasing and decreasing range portions of the lower curve. Thus, the voltage at the point B or the output of the rectifier and filter will be decreasing with the increasing range, but should the target suddenly turn toward the radar system so that the range commences to decrease, the voltage will commence to rise from some point intermediate 10 and 11 volts due to the increased strength of the reflected signal.

The relay 25 will remain in its position in which the movable arms 31 and 32 are in contact with their lower contacts. The movement of the arms 33, 34 and 35 of the relay 28 into the lower position when the voltage at point B reaches 12 volts will couple the negative terminal 51 of the battery 52 to the charging resistor 15 and the capacitor 14 through the lead 53, the movable arm 35, lead 61, movable arm 32 and lead 42. This action reduces the gain of the amplifier 13 until the voltage at point B or the output of the rectifier and filter falls to 10 volts. At this time, the movable arms 31 and 32 of relay 25 move into their upper positions thereby decoupling the battery 52 from the charging resistor 15 and stabilizing the gain of amplifier 13. As a result, the system is brought back to the case previously discussed of an increasing signal brought about by a decreasing range and the relay 25 will switch periodically as the voltage at point B alternates between 10 and 11 volts.

In summation, the present invention provides an uncomplicated and economical means for determining range between a radar system and a target that has relative movement with respect to the radar system. This is accomplished by using a hysteresis device and a simple counter for solving the equation $$R = n \cdot (\Delta R/\Delta S)/S$$

in which the hysteresis device permits $\Delta R$ to be determined by a direct counting of the Doppler cycles during a period in which a predetermined relative change in signal strength, that is $\Delta S/S$, takes place.

It is to be understood that this invention is not to be limited to the exact construction shown and described, but that various changes and modifications may be made without departing from the spirit and scope of the invention as defined in the appended claims.

I claim:

1. A radar system for measuring range between a system and a target in which range is not a constant comprising, a continuous wave transmitting means for radiating a continuous wave signal toward the target, means for receiving the signal reflected from the target, detector means coupled to said last mentioned means for detecting the Doppler signal, and means coupled to said detector means for counting the number of Doppler cycles during a predetermined change in the relative signal strength of the signal reflected from the target.

2. A radar system for measuring range between a system and a target in which range is not a constant comprising, a continuous wave transmitting means for radiating a continuous wave signal toward the target, means for receiving the signal reflected from the target, detector means coupled to said last mentioned means for detecting the Doppler signal, counter means coupled to said detector means for counting the number of Doppler cycles, and means coupled to said counter and to said detector for resetting the counter when the relative change in signal strength of the reflected signal reaches a predetermined value.

3. A radar system for measuring range between a system and a target in which range is not a constant comprising, a continuous wave transmitting means for radiating a continuous wave signal toward the target, means for receiving the signal reflected from the target, detector means coupled to said last mentioned means for detecting the Doppler signal, counter means coupled to said detector means for counting the number of Doppler cycles, an electrical means having a selected amount of hysteresis coupled to said detector means and to said counter means for sensing a selected relative change in the strength of the reflected signal determined by said selected amount of hysteresis and resetting said counter means when said selected relative change in the strength of the reflected signal is achieved.

4. A radar system for measuring range between a system and a target in which range is not a constant comprising, a continuous wave transmitting means for radiating a continuous wave signal toward the target, means for receiving the signal reflected from the target, detector means coupled to said last mentioned means for detecting the Doppler signal, counter means coupled to said detector means for counting the number of Doppler cycles, an amplifier coupled to said detector means, electrical switch means having two positions and having an input circuit coupled to said amplifier for sensing the strength of the received signal, said electrical switch means being operable to switch from one position to the other when the strength of the received signal changes a predetermined percentage from a predetermined value, means coupling said counter to said switch means for resetting the counter when said switch means moves from one position to the other, and means coupled to said amplifier through said switch means to change the gain of said amplifier to the point where the amplified signal is restored to its original predetermined value whereby said switch means is switched back to its original position.

5. A radar system for measuring range between a system and a target in which range is not a constant comprising, a continuous wave transmitting means for radiating a continuous wave signal toward the target, means for receiving the signal reflected from the target, detector means coupled to said last mentioned means for detecting the Doppler signal, counter means coupled to said detector means for counting the number of Doppler cycles, amplifier means coupled to said detector means, and a bistable switching device having a hysteresis that is a fixed percentage of the energy input necessary to cause said switching device to be switched from one position to another, said bistable switching device having an input coupled to the output of said amplifier, and means coupling said bistable switching device to said counter means for resetting said counter and to said amplifier for restoring the output signal of said amplifier to its original level when the relative change in the output signal from said amplifier reaches a predetermined value.

6. A radar system for measuring range between a system and a target in which range is not a constant comprising, a continuous wave transmitting means for radiating a continuous wave radar signal toward the target, means for receiving the signal reflected from the target, detector means coupled to said last mentioned means for detecting the Doppler signal, counter means coupled to said detector means, and means coupled to said detector means and said counter means for sensing a selected relative change in the strength of the signal reflected from the target and for displaying the output of said counter when selected relative change is sensed.

7. A radar system for measuring range between a system and a target in which range is not a constant comprising, a continuous wave transmitting means for radiating a continuous wave radar signal toward the target, means for receiving the signal reflected from the target, detector means coupled to said last mentioned means for detecting the Doppler signal, a counter means coupled to said detector means, said counter means including a pulse shaper means for producing a series of identical unidirectional pulses in response to the applied Doppler signal and an integrating means coupled to said pulse shaper means for producing a unidirectional voltage directly proportional to the number of Doppler cycles received by said counter means, and means coupled to said detector means and said integrating means for sensing a selected relative change in the strength of the signal reflected from the target and for measuring and displaying the voltage produced by said integrating means during said selected relative change in the strength of the selected signal.

8. A radar system for measuring range between a system and a target in which range is not a constant comprising, a continuous wave transmitting means for radiating a continuous wave radar signal toward the target, means for receiving the signal reflected from the target, detector means coupled to said last mentioned means for detecting the Doppler signal, amplifier means coupled to said detector means and having a gain control circuit, rectifying and filtering means coupled to said amplifier means for rectifying and filtering the output of said amplifier means, counter means coupled to said amplifier means for counting the number of Doppler cycles, and bistable switch means switchable between two positions with a selected amount of hysteresis, said bistable switch means having an input circuit coupled to said rectifying and filtering means and an output circuit coupled to said counter means and to said gain control circuit of said amplifier, said output circuit including means for resetting said counter and for reducing the gain of the amplifier to restore the output of said rectifying and filtering means to its original value after said bistable switch means has been switched from its original position to its other position upon a selected relative change in the magnitude of the output of said rectifying and filtering means whereby said switch means is switched back to its original position and the gain of said amplifier is stabilized.

No references cited.

CHESTER L. JUSTUS, *Primary Examiner.*
RODNEY D. BENNETT, *Examiner.*